(12) United States Patent
Grassman

(10) Patent No.: US 8,487,470 B2
(45) Date of Patent: Jul. 16, 2013

(54) VERTICAL AXIS WIND TURBINE AND GENERATOR THEREFORE

(76) Inventor: Derek Grassman, Port Byron, NY (US)

(*) Notice: Subject to any disclaimer, the term of this patent is extended or adjusted under 35 U.S.C. 154(b) by 500 days.

(21) Appl. No.: 12/711,808

(22) Filed: Feb. 24, 2010

(65) Prior Publication Data

US 2010/0295316 A1 Nov. 25, 2010

Related U.S. Application Data

(60) Provisional application No. 61/213,281, filed on May 22, 2009.

(51) Int. Cl.
*F03D 9/00* (2006.01)

(52) U.S. Cl.
USPC ............................................. 290/55; 310/268

(58) Field of Classification Search
None
See application file for complete search history.

(56) References Cited

U.S. PATENT DOCUMENTS

| | | | |
|---|---|---|---|
| 5,625,240 A * | 4/1997 | Bernus | 310/90.5 |
| 6,794,777 B1 * | 9/2004 | Fradella | 310/74 |
| 6,794,781 B2 | 9/2004 | Razzell et al. | |
| 6,849,978 B2 | 2/2005 | Sun et al. | |
| 6,891,302 B1 | 5/2005 | Gabrys | |
| 7,081,696 B2 | 7/2006 | Ritchey | |
| 7,375,449 B2 | 5/2008 | Butterfield | |
| 7,385,330 B2 | 6/2008 | Trzynadlowski et al. | |
| 7,579,742 B1 | 8/2009 | Rittenhouse | |
| 7,592,766 B2 * | 9/2009 | Patel et al. | 318/400.02 |
| 7,595,574 B2 | 9/2009 | Ritchey | |
| 7,646,126 B2 | 1/2010 | Trzynadlowski et al. | |
| 8,106,563 B2 * | 1/2012 | Ritchey | 310/268 |
| 8,143,738 B2 * | 3/2012 | Kim | 290/55 |
| 2004/0247438 A1 | 12/2004 | McCoin | |
| 2007/0098563 A1 | 5/2007 | Rowan et al. | |
| 2008/0315709 A1 | 12/2008 | Uchiyama | |

(Continued)

FOREIGN PATENT DOCUMENTS

| | | |
|---|---|---|
| WO | WO-2007129299 A2 | 11/2007 |
| WO | WO-2009010736 A2 | 1/2009 |
| WO | WO-2009050686 A2 | 4/2009 |

OTHER PUBLICATIONS

A Novel Transverse Flux Generator in Direct-Driven Wind Turbines, D. Svechkarenko, J. Soulard and C. Sadarangani, Division of Electrical Machines and Power Electronics, School of Electrical Engineering, Royal Institute of Technology, Sweden (6 pgs.).

(Continued)

*Primary Examiner* — Michael Zarroli
(74) *Attorney, Agent, or Firm* — Harris Beach PLLC

(57) ABSTRACT

A vertical wind turbine is provided that includes a support base defined about an axis, a bearing assembly, a drive shaft having a proximal end and an opposing distal end, and a multistage axial flux generator. The bearing assembly includes a fixed ring and a rotating ring, wherein the fixed ring is coupled to the support base. The drive shaft is coupled to the rotating ring of the bearing assembly, and a plurality of sails are coupled to the drive shaft. The multistage axial flux generator includes a rotor assembly coupled to the drive shaft and a stator assembly coupled to the support base. The rotor assembly includes a plurality of permanent magnets, and the stator assembly includes a plurality of coils defining at least two voltage output stages. The permanent magnets on the rotor assembly are close-coupled to the coils on the stator assembly.

11 Claims, 7 Drawing Sheets

U.S. PATENT DOCUMENTS

2009/0295168 A1    12/2009   Meinke et al.
2010/0111689 A1*   5/2010    Davis ............................ 415/229
2010/0194251 A1*   8/2010    Sikes ........................... 310/68 D

OTHER PUBLICATIONS

Optimal Design and Control of Axial-Flux Brushless DC Wheel Motor for Electrical Vehicles, Y.P. Yang, C.H. Cheung, S.W. Wu, J.P. Wang, Department of Mechanical Engineering, National Taiwan University, Taiwan (10 pgs.).

Axial Flux, Modular, Permanent-Magnet Generator with a Toroidal Winding for Wind Turbine Applications, E. Muljadi, C.P. Butterfield, Y. Wan, National Wind Technology Center, National Renewable Energy Laboratory, Jul. 1998 (7 pgs.).

Design Analysis of High-Speed Axial-Flux Generator, M. Sadeghierad, A. Darabi, H. Lesani and H. Monsef, Department of Electrical and Computer Engineering, University of Tehran, Iran, American J. O f Engineering and Applied Sciences 1 (4): 312-317, 2008, ISSN 1941-7020, © 2008 Science Publications (6 pgs.).

Axial-Flux Permanent-Magnet Machines (Chapter 3), http://alexandria.tue.nl/extra2/200111643.pdf (33 pgs.).

Scoraig Wind Electric, Hugh Piggott, The Permanent Magnet Generator (PMG): A manual for manufacturers and developers, Jun. 2001, http://www.practicalaction.org.uk/energy/our-work/docs/energy/pmg_manual.pdf (51 pgs.).

International Search Report and Written Opinion mailed May 25, 2010 (11 pgs.).

* cited by examiner

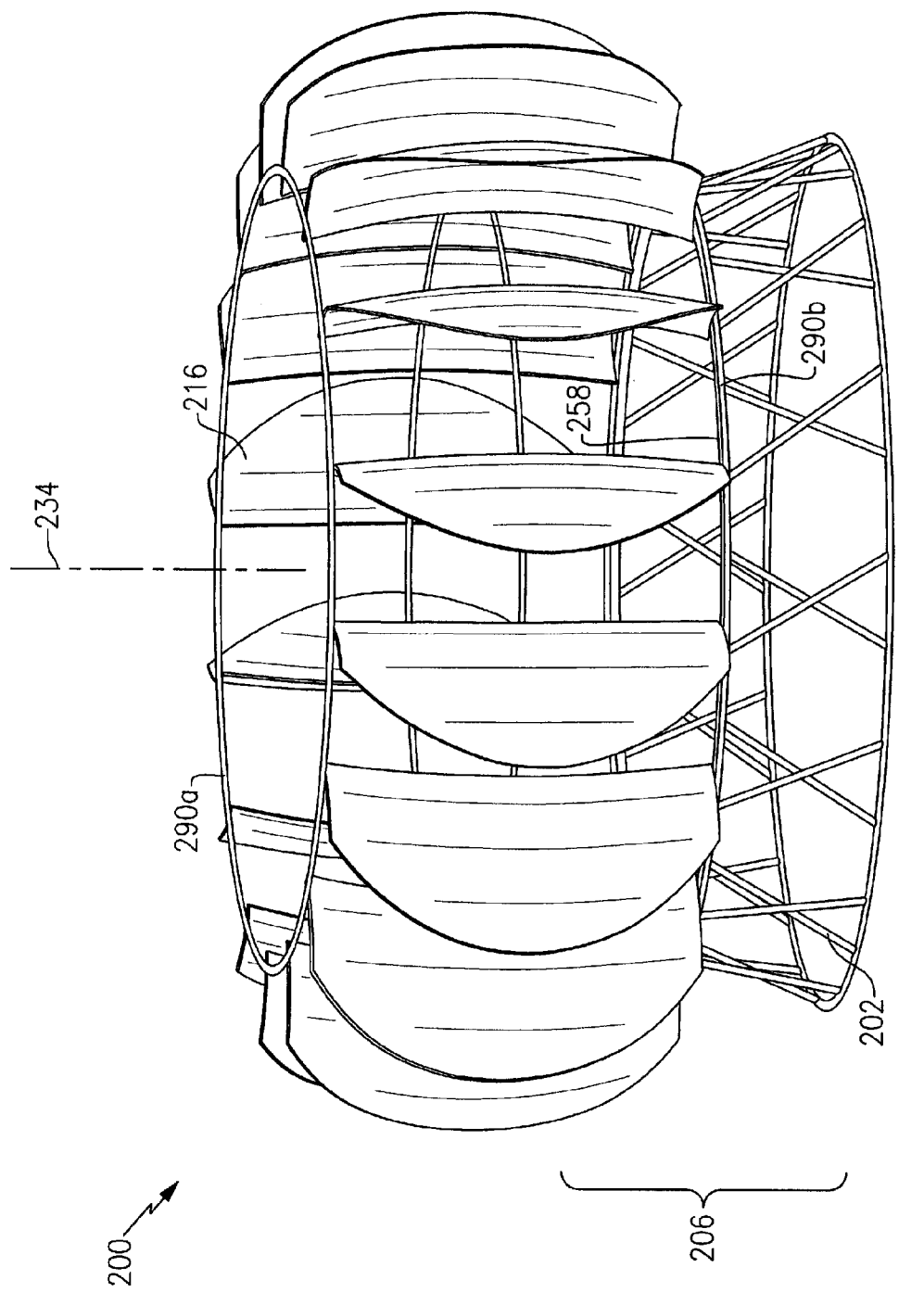

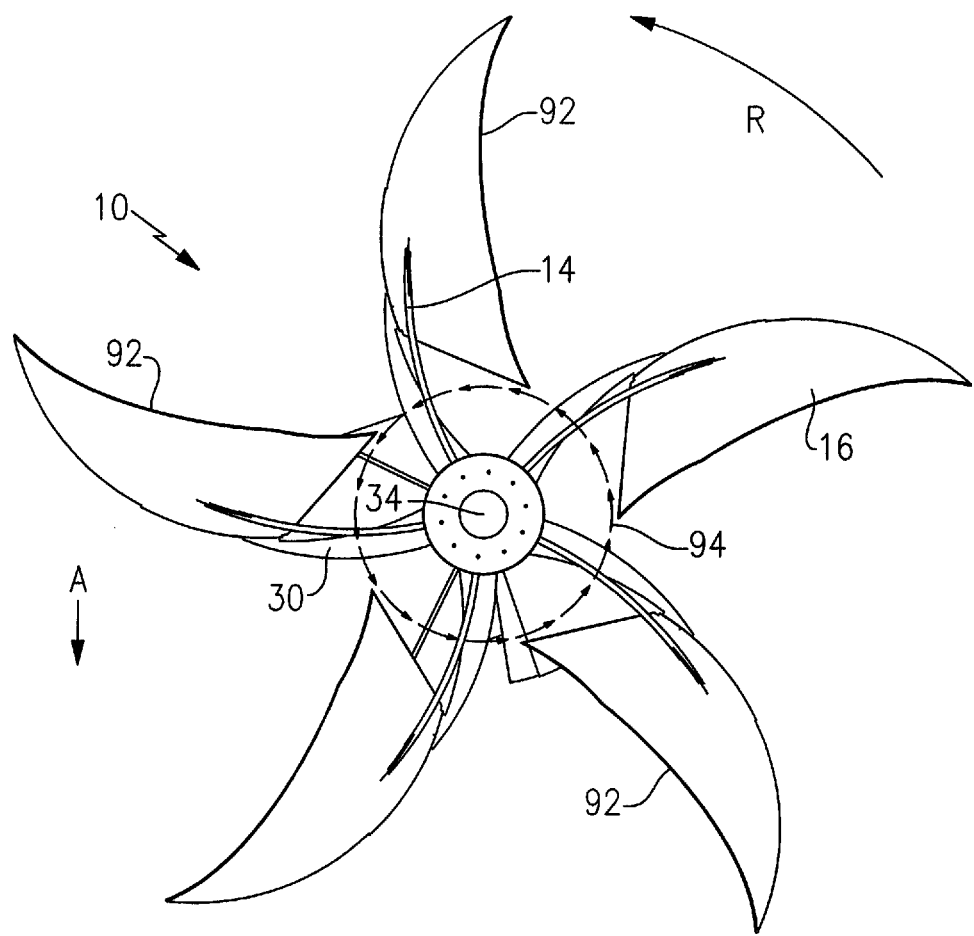
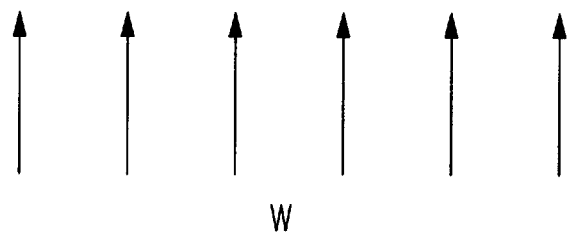

VERTICAL AXIS WIND TURBINE AND GENERATOR THEREFORE

CROSS REFERENCE TO RELATED APPLICATION

Reference is made to and this application claims priority from and the benefit of U.S. Provisional Application Ser. No. 61/213,281, filed May 22, 2009, entitled "VERTICAL AXIS WIND TURBINE", which application is incorporated herein in its entirety by reference.

FIELD OF THE INVENTION

This disclosure relates generally to vertical axis wind turbines and, more specifically, to a vertical axis wind turbine having a multistage axial flux generator.

BACKGROUND OF THE INVENTION

There is a growing need for clean energy in the world, and one of the cleanest and most abundant sources is wind energy. Horizontal axis wind turbines have traditionally been utilized to harness wind energy, but they suffer from drawbacks. For example, current horizontal axis wind turbines have low efficiency due to large gears and transmissions. Parasitic power is consumed by the constant reorientation of the blades into the wind stream. Horizontal axis wind turbines are unable to harness turbulent winds, and are susceptible to damage in high winds.

Vertical axis wind turbines are characterized by the axis of blade rotation being at a right angle to the wind direction. Vertical axis wind turbines have been in use for many decades, and include drag-based designs that move by being pushed by the wind, and lift-based designs which move from lift that is developed by the vanes. The principal advantage of a vertical axis wind turbine is that it does not require alignment with the direction from which the wind is blowing, thus saving the cost of additional motors and controllers. However, several common problems have stymied efforts to bring vertical axis wind turbines into broad commercial acceptance.

One noted problem with vertical axis wind turbines is that they suffer inefficiencies due to drag during part of the rotation, which is a consequence of the vane shapes and gearing. One proposed solution was a wind turbine design that utilized flat fans mounted pivotally on a support structure to catch wind and cause the support structure to rotate. As the fans orbited the vertical axis, they pivoted between a downwind orientation, presenting a broad area that catches the wind, and an upwind orientation in which a narrower profile passes before the wind in order to create less drag. One noted drawback to that design was that the flat fans were not very aerodynamic in design, and thus operation was rough and slow, with the fans being pulled out of position by centrifugal force. The fans provided drive only intermittently during a somewhat small portion of each rotation.

Another solution was a wind turbine design that employed flat vanes on a rotating frame. The two-phase vanes were balanced on the vertical axis so that they pivoted about 170 degrees between a high-drag position downwind and a low-drag position upwind. The wind turbine exhibited drag rotation over 180 degrees of each revolution, but vane interference of the upwind vane over the downwind vane in its wind shadow reduced overall effectiveness. Thus, the effective transference of force occurred over less than 180 degrees.

Still other solutions were attempted utilizing a lift-based design. For example, one solution disclosed a lift-based vertical axis wind turbine that included vertically arranged vanes mounted pivotally on a rotating base. As the vanes caught the wind and moved the support, they orbited the vertical axis. A wind-vane-controlled pitch adjustment continually oriented the airfoils relative to the wind direction. The device detected wind direction by means of a vane, and positioned the controlling pitch flange accordingly. One drawback to this approach was that the positioning of the airfoils was only effective in the directly windward and directly leeward positions, using crosswind lift force in both cases.

Another solution involving a lift-based vertical axis wind turbine was to use "free flying" airfoils, wherein the airfoils were self-positioning according to the local dynamic conditions to which they were subjected, thereby creating a condition of equilibrium in order to make the engine more efficient. More specifically, the literature disclosed a vertical axis wind engine with a rotor mounted on a base for rotation about a vertical axis. One or more airfoil(s) were mounted on the rotor so that it was free to pivot between preset first and second limits of pivotal movement (e.g., set by stop mechanisms). That arrangement enabled the airfoil to align according to the wind as it orbited the vertical axis, thereby achieving better conversion of wind energy to useable rotational energy by combining lift and drag characteristics at low speeds and shifting to lift-only characteristics at rotor speeds approaching or exceeding local wind speed. Wind forces and armature-constraining action established airfoil positions. The airfoils rotated freely through an arc of approximately 90 degrees, bounded by stop mechanisms. The span of travel was from a radial line along the mounting arm (radially aligned relative to the vertical axis) to a perpendicular position (tangentially aligned relative to the vertical axis). The design allowed for each airfoil to set its own instantaneous angle and to adjust to conditions of relative wind, wind shift, and so forth occurring outside and within the wind engine, without external adjustments or mechanisms, wind vanes, centrifugal governors, or other controlling devices. Individual airfoils adjusted to local conditions based on changes of rotor speed, turbulence, true relative wind, and other factors affecting each of them independently. A drawback to this design, however, was that the efficiency was limited because the airfoils rotated through only about a 90 degree arc (out of a possible 360 degrees) and were constrained by stops.

A further drawback to the various vertical axis wind turbines is similar to those inefficiencies found in the horizontal models, namely that there is a relatively large amount of weight carried by the bearings that support vertically rotating components. In addition to the loss of energy resulting from the friction between the relative components, this leads to the need to replace bearings on a regular basis.

SUMMARY OF THE INVENTION

In view of the background, in one aspect of the invention a multistage axial flux generator is provided that includes a support base defined about an axis. A disc-shaped stator assembly is coupled to the support base. The stator assembly has a first planar side, a second planar side opposite the first planar side, and a central bore oriented along the axis. The stator assembly includes a plurality of coils on the first planar side defining at least two operative voltage output stages. The multistage axial flux generator further includes a disc-shaped rotor assembly defined about the axis and coupled to a drive shaft. The rotor assembly includes a plurality of permanent magnets secured to a planar face thereof. The permanent magnets are close-coupled to the coils on the stator assembly. The multistage axial flux generator further includes a bearing assembly having a fixed ring and a rotating ring. The fixed ring coupled to the support base, the rotating ring coupled to the rotor assembly.

In another aspect of the invention, the multistage axial flux generator further includes a rotation augmentation assembly. The rotation augmentation assembly includes a rotor augmentation magnet coupled to a diameter of the rotor assembly. The rotor augmentation magnet is aligned at a first tangential offset angle relative to a radial line extending from the axis of the drive shaft. The first tangential offset angle is in the range of 1 degree to 30 degrees. The rotation augmentation assembly further includes a stationary augmentation magnet secured to the support base. A like pole of the stationary augmentation magnet is aligned at a second tangential offset angle relative to a radial line extending from the axis of the drive shaft. The second tangential offset angle is in the range of 1 degree to 30 degrees.

In another aspect of the invention, the voltage output stages of the multistage axial flux generator are defined by a wire winding diameter and a number of windings.

In another aspect of the invention, the stator assembly further includes a second plurality of windings on the second planar side defining at least two voltage output stages. The multistage axial flux generator further includes a second disc-shaped rotor portion defined about the axis coupled to the drive shaft, wherein the second disc-shaped rotor portion includes a second plurality of permanent magnets secured to a planar face thereof. The second plurality of permanent magnets are close-coupled to the second plurality of windings on the stator assembly.

In another aspect of the invention, a vertical wind turbine is provided that includes a support base defined about an axis, a bearing assembly, a drive shaft having a proximal end and an opposing distal end, and a multistage axial flux generator. The bearing assembly includes a fixed ring and a rotating ring, wherein the fixed ring is coupled to the support base. The drive shaft is coupled to the rotating ring of the bearing assembly, and a plurality of sails are coupled to the drive shaft. The multistage axial flux generator includes a rotor assembly coupled to the drive shaft and a stator assembly coupled to the support base. The rotor assembly includes a plurality of permanent magnets, and the stator assembly includes a plurality of coils defining at least two voltage output stages. The permanent magnets on the rotor assembly are close-coupled to the coils on the stator assembly.

In another aspect of the invention, the wind turbine further includes a sail assembly coupled to the drive shaft. The sail assembly includes a sail hub, and a plurality of sail mount arms coupled to the sail hub. The plurality of sails are coupled to the sail mount arms.

In another aspect of the invention, the bearing assembly is a magnetic bearing assembly and the plurality of sails define a vertical load. At least a portion of the vertical load is counteracted by the magnetic bearing assembly.

In another aspect of the invention, the support base includes a housing portion and a support column concentric about the axis.

In another aspect of the invention, the fixed ring of the bearing assembly is coupled to the support column, and rotating ring of the bearing assembly is coupled to the proximal end of the drive shaft.

In another aspect of the invention, the rotor assembly of the multistage axial flux generator is coupled to the distal end of the drive shaft, and the stator assembly is coupled to the housing portion of the support base.

In another aspect of the invention, the plurality of sails are coupled to the proximal end of the drive shaft.

In another aspect of the invention, the vertical wind turbine further includes a rotation augmentation assembly. The rotation augmentation assembly includes a rotor augmentation magnet coupled to a diameter of the rotor assembly. The rotor augmentation magnet is aligned at a first tangential offset angle relative to a radial line extending from the axis of the drive shaft. The first tangential offset angle is in the range of 1 degree to 30 degrees. The rotation augmentation assembly further includes a stationary augmentation magnet secured to the support base. A like pole of the stationary augmentation magnet is aligned at a second tangential offset angle relative to a radial line extending from the axis of the drive shaft. The second tangential offset angle is in the range of 1 degree to 30 degrees.

In yet another aspect of the invention, a method for operating a multistage axial flux generator is provided comprising the steps of providing a stator assembly defined about an axis. The stator assembly includes a plurality of coils defining at least two operative voltage output stages. The coils are in electrical communication with a voltage device. The method for operating the multistage axial flux generator further includes the steps of providing a rotor assembly defined about the axis, positioning the rotor assembly in sufficient proximity to the stator assembly such that rotation of the rotor assembly about the axis generates a magnetic field in the coils, driving the rotor assembly by an external force, and adding successive operative voltage output stages to the voltage device as the rotational speed of the rotor assembly increases. The rotor assembly includes a plurality of permanent magnets.

In another aspect of the invention, a sail assembly is coupled to the rotor assembly. The first operative voltage output stage is added to the voltage device when the wind speed reaches 5 miles per hour.

BRIEF DESCRIPTION OF THE DRAWINGS

For a further understanding of the invention, reference will be made to the following detailed description of the invention which is to be read in connection with the accompanying drawing, wherein:

FIG. 6 is a perspective view of a vertical axis wind turbine according to another embodiment of the invention; and FIG. 7 is a top plan view of the vertical axis wind turbine of FIG. 1.

DETAILED DESCRIPTION OF THE INVENTION

Figure 1:
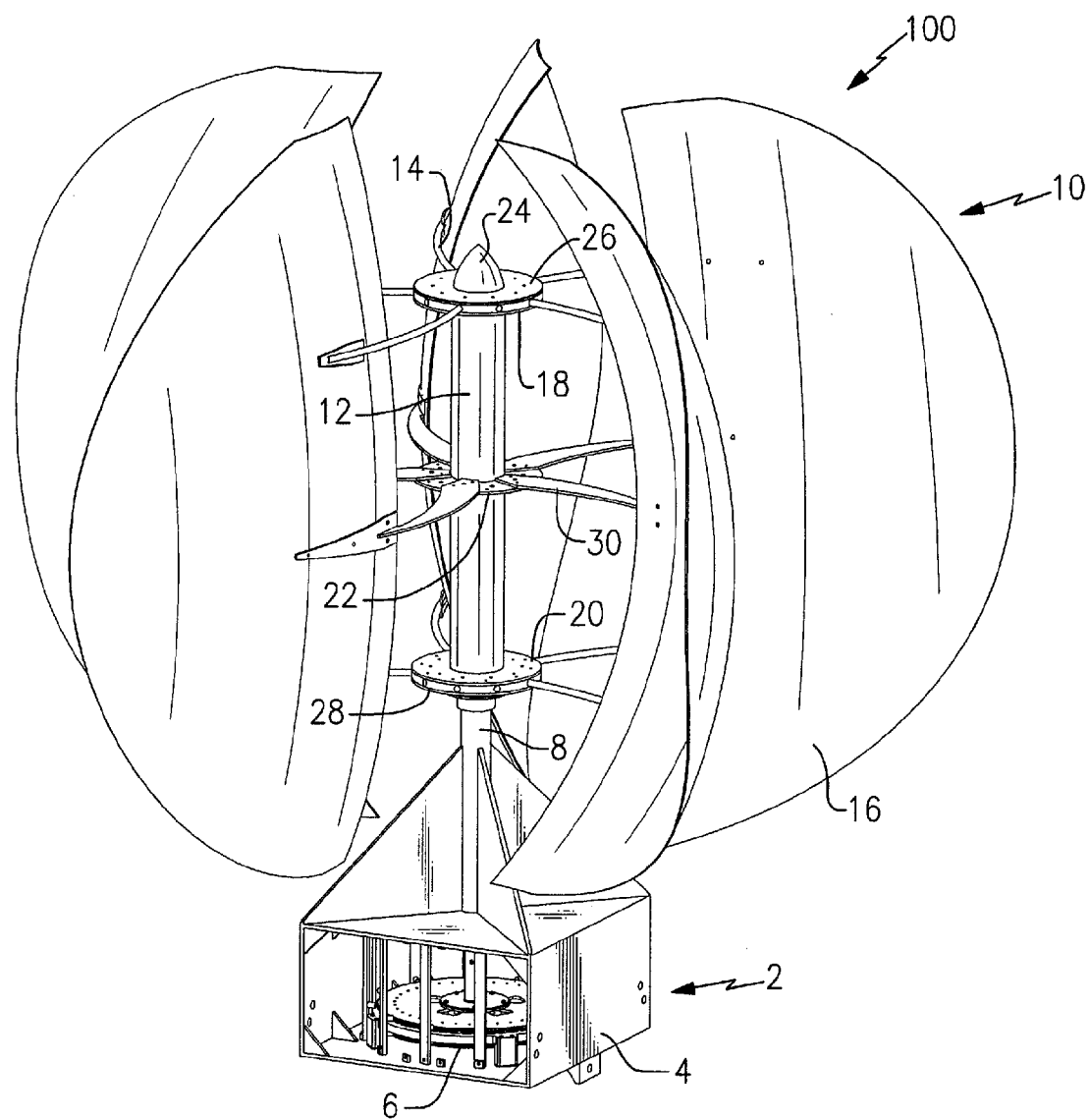
FIG. 1 is a perspective view of a vertical axis wind turbine according to an embodiment of the invention.

Referring to FIG. 1, a vertical axis wind turbine 100 generally includes a support base 2 that, in one example, mounts to the roof of a house. In the disclosed embodiment, the support base 2 includes a housing portion 4 in which a multistage axial flux generator 6 is located. The support base 2 may further include a vertically-extending support column 8 to provide support for a sail assembly 10 mounted thereon.

The sail assembly 10 includes a sail hub 12, a plurality of sail mount arms 14 fixed to the sail hub 12, and a plurality of sails 16 attached to the sail mount arms 14. The sail hub 12 is a hollow cylinder with an upper flange 18, a lower flange 20, and a central stiffening ring 22. A cap 24 protects the rotating components from exposure to the elements. The sail mount arms 14 at the top of the sail hub 12 are secured in between the upper flange 18 and a upper hub 26. The sail mount arms 14 at the bottom of the sail hub 12 are secured in between the lower flange 20 and a lower hub 28. Both the upper hub 26 and the lower hub 28 are supported by bearing assemblies, as will be described in detail below. Sail stiffener arms 30 attach to the mid-span of the sails 16 and bolt to the stiffening ring 22 to provide additional rigidity to the large sails 16.

Unlike the conventional airfoil shapes known in the art and used in vertical wind turbines, the sails 16 disclosed in the present invention have a very low aspect ratio. As used herein, aspect ratio is defined as the square of the wingspan (e.g., height of the sail) divided by the area of the sail planform. The sails 16 are designed more to capture the wind than to create aerodynamic lift. The sails 16 are rigid, and may be fabricated from fiberglass, carbon fiber, or aluminum, for example.

Figure 2:
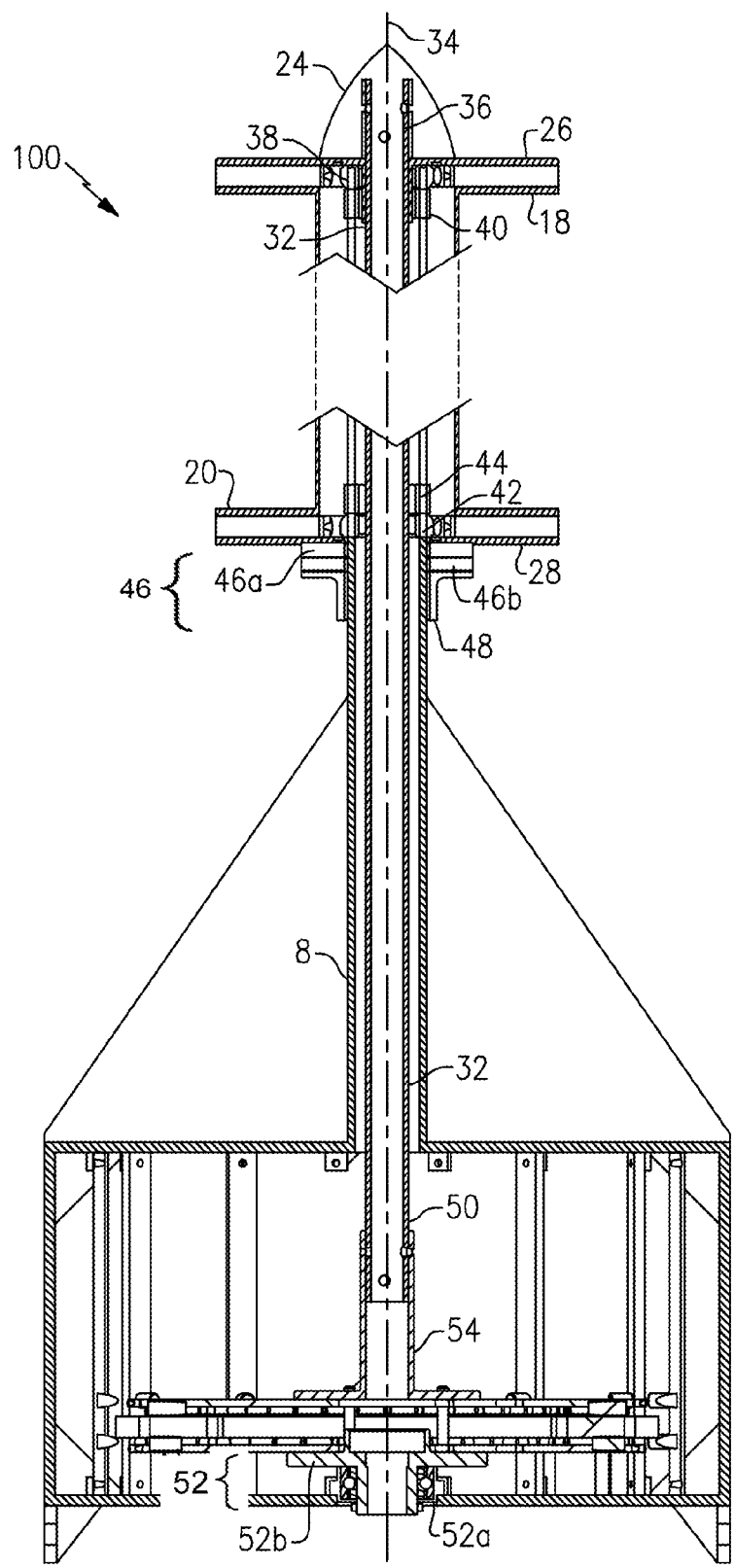
FIG. 2 is a cross sectional view of the vertical axis wind turbine of FIG. 1, the cross section taken through the vertical axis of the drive shaft.

Turning now to FIG. 2, the vertical axis wind turbine 100 is shown in cross section to better illustrate the rotating components. For clarity, the sails 16, sail mount arms 14, and sail stiffener arms 30 have been removed. A drive shaft 32 rotates about a vertical axis 34 within the support column 8. The upper hub 26 is secured to a top or proximal end 36 of the drive shaft 32. In this manner, the rotation of the sail hub 12 caused by wind blowing on the sails 16 transfers directly to the drive shaft 32. In the disclosed embodiment, the upper hub 26 is supported by a tapered bearing 38. The inner race of the bearing 38 is fixed to an upper stopper ring 40 that abuts the top surface of the support column 8, and the outer race is captured within the upper hub 26.

The lower hub 28 is similarly supported by a second tapered bearing 42. The inner race of the bearing is fixed to a lower stopper ring 44 that is in contact with a face of the support column 8 (the support column is sectioned), and the outer race is captured by the lower hub 28. In addition, the lower hub 28 and a significant portion of the weight of the sail assembly 10 is supported a magnetic bearing assembly 46. The magnetic bearing assembly 46 includes two halves: an upper half 46a secured to the bottom of the lower hub 28 and is free to rotate, and a lower half 46b that is fixed to support column 8. In the disclosed embodiment, the lower half 46b is secured to a magnet bearing support 48, and the magnet bearing support is fixed to the support column 8. In one example, the magnetic bearing assembly 46 is comprised of two grade 45 neodymium magnets. Each bearing half measures 6 inches in outer diameter, 4 inches in inner diameter, and 0.5 inches thick. The magnetic bearing assembly 46 may be utilized to unload virtually all the weight from the rotating components of the vertical axis wind turbine 100, thereby allowing the assembly to "float" in the vertical axis 34. In addition, the magnetic bearing assembly 46 ideally absorbs transient buffeting loads from wind gusts and the like.

A lower or distal end 50 of the drive shaft 32 is coupled to the multistage axial flux generator 6. The generator 6 is further supported by a lower bearing 52, which in one embodiment is a conventional automobile hub assembly. The fixed portion 52a of the lower bearing is mounted to the support base 2, and the rotating portion 52b secures the rotating components of the generator 6 to a drive shaft collar 54. The drive shaft collar 54 is fastened to the distal end 50 of the drive shaft 32.

Figure 3:
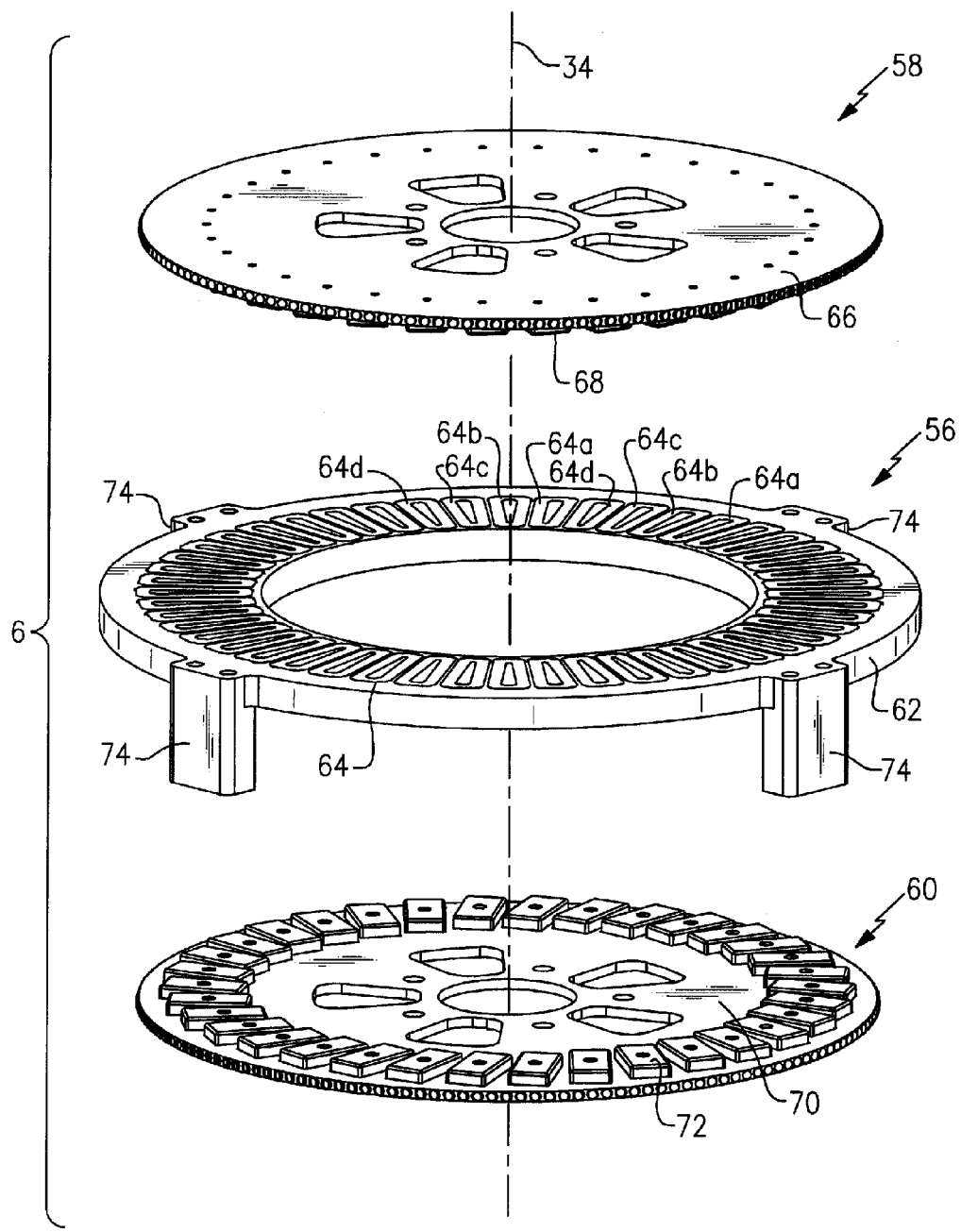
FIG. 3 is an exploded perspective view of a multistage axial flux generator from the vertical axis wind turbine of FIG. 1.

Turning to FIG. 3, the multistage axial flux generator 6 includes a stationary stator assembly 56 and at least one rotor assembly 58. In the disclosed embodiment, the multistage axial flux generator 6 includes a second rotor assembly 60, the benefits of which will be discussed below. The stator assembly 56 includes a disc-shaped, non-magnetic stator housing 62 rigidly attached to the support base 2 (not shown). A plurality of wire coils 64 are spaced about the periphery of the stator housing 62. The coils 64 may be a cored coil or a coreless coil. The coils 64 generate electrical current when a magnetic field is passed within close proximity. The coils 64 are classified into at least two groups, or stages, of operative output voltage. By utilizing multiple stages of output voltage, the multistage axial flux generator 6 of the present invention generates useful power over a larger range of wind speeds.

In the disclosed embodiment, four voltage output stages are utilized, denoted by coils 64a, 64b, 64c, and 64d. The four stages are arranged in a sequentially repetitive fashion, as shown in FIG. 3. Each stage is designed to begin producing useful voltage at a different rotational speed of the rotor assembly 58, as will be explained in detail below, and further reaches its peak efficiency at a different rotational speed.

Several constructions for securing the coils 64 into the stator housing 62 are possible. In the disclosed embodiment, a plurality of cutouts are machined into the stator housing 62 equaling the number of coils 64. The coils 64 may be press fit into the cutouts, epoxy bonded, or otherwise secured. In the given example, cutouts are preferred so as to expose the coils 64 on both planar surfaces of the stator housing 62. However, in another embodiment, wherein a single rotor assembly 58 is utilized (e.g., second rotor assembly 60 is not present), it may be preferable to machine recesses into the stator housing 62 rather than cutouts. In another example, the coils 64 may be encased, or buried, within the stator housing 62.

The rotor assembly 58 of the multistage axial flux generator 6 includes a disc-shaped rotor housing 66 with a plurality of permanent magnets 68 secured about its perimeter. The rotor housing 66 may be fabricated from steel, for example. The placement of the magnets 68 is such that their magnetic field flux is parallel to the axis 34 of the drive shaft, hence, axial flux generator. The magnets 68 are arranged to be close-coupled to the coils 64 on the stator assembly 56 such that the magnetic flux field from each magnet 68 induces current in the coils 64. In this manner, sufficient useful current may be realized. In one example, thirty six (36) rectangular grade 42 neodymium magnets measuring 2 inches by 1 inch by 0.5 inches thick are secured to the rotor housing 66 with a close-coupling distance of approximately 0.0625 inches with the coils 64.

In one embodiment, four stages of coils 64 are utilized in the stator assembly 56, with twelve (12) coils in each stage. In one example, Stage 1 comprises 450 windings of 23-gage enameled winding wire, Stage 2 comprises 375 windings of 22-gage wire, Stage 3 comprises 340 windings of 21-gage wire, and Stage 4 comprises 290 windings of 20-gage wire. The first stage would thus create the highest voltage for any given wind speed, the second stage would produce the second highest voltage, and so forth. Table I displays a theoretical voltage output by each stage for a given wind speed. As can be seen with reference to Table I, Stage 1 begins producing useful voltage output, defined as 13 volts, at 5 miles per hour (mph). At 8 mph, Stage 2 begins producing useful voltage while Stage 1 is producing 24 volts. At 14 mph, Stage 3 begins producing useful voltage while Stage 2 is producing 24 volts and Stage 1 is producing 36 volts. Finally, at 18 mph Stage 4 begins producing useful voltage while at the same wind speed Stage 3 is producing 24 volts, Stage 2 is producing 36 volts, and Stage 1 is producing 48 volts.

TABLE I

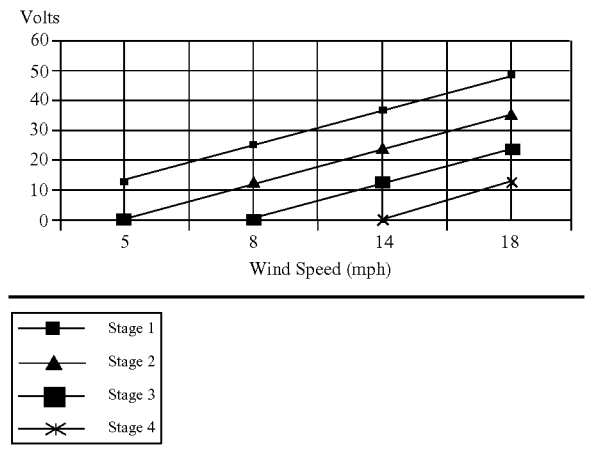

The number of voltage output stages may vary depending upon the particular application and circumstances. Smaller systems may only need two voltage output stages, while large commercial systems generating 500 kilowatts or more may require over 100 voltage output stages.

Although not required by the present invention, the multistage axial flux generator 6 includes a second rotor assembly 60 to increase the magnetic flux and induced current in the coils 64. In the disclosed embodiment, the second rotor assembly 60 is constructed essentially the same as the first rotor assembly 58. That is, the rotor assembly 60 includes a second rotor housing 70 and a plurality of second magnets 72 oriented to create magnetic flux parallel to the axis of the drive shaft 32. The second magnets 72 are close-coupled to the coils 64 in the stator assembly 56 to induce additional electrical current in the windings.

The electrical leads from the coils 64 are bundled and routed to a voltage device (not shown) that utilizes the electrical energy created by the multistage axial flux generator 6. In the disclosed embodiment, the four voltage output stages are routed through four support pillars 74 on the stator housing 62. Each voltage output stage is wired to the voltage device, which in one example is a rectifier for conversion to DC.

In another embodiment of the invention, the sail assembly 10 is not vertically extended from the housing portion 4 of the support base 2. That is, the support column 8 is not present, the drive shaft 32 is shortened considerably, and the sail assembly 10 is positioned proximate to the multistage axial flux generator 6. In one example, the sail assembly 10 is coupled to the collar 54 proximate to the rotor assembly 58. In another example, the sail assembly 10 is coupled directly to the rotor assembly 58.

Figure 4:
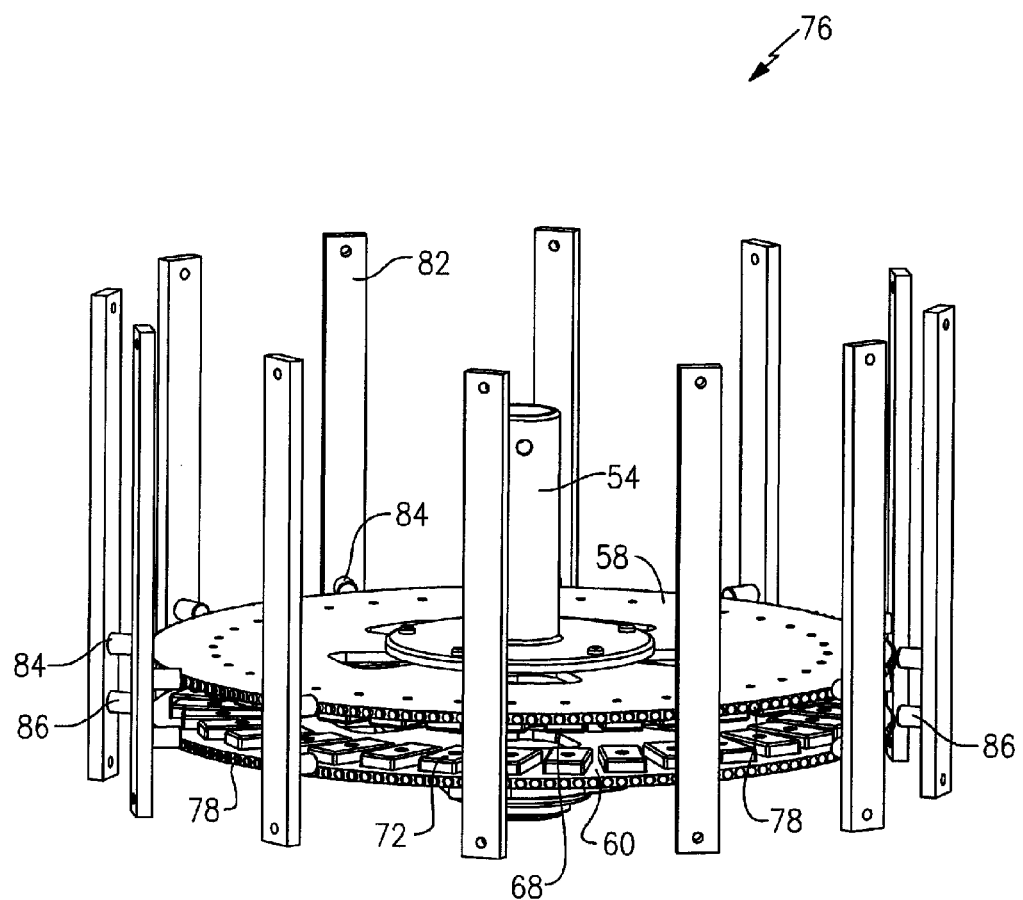
FIG. 4 is a perspective view of a rotation augmentation assembly from the vertical axis wind turbine of FIG. 1.
Figure 5:
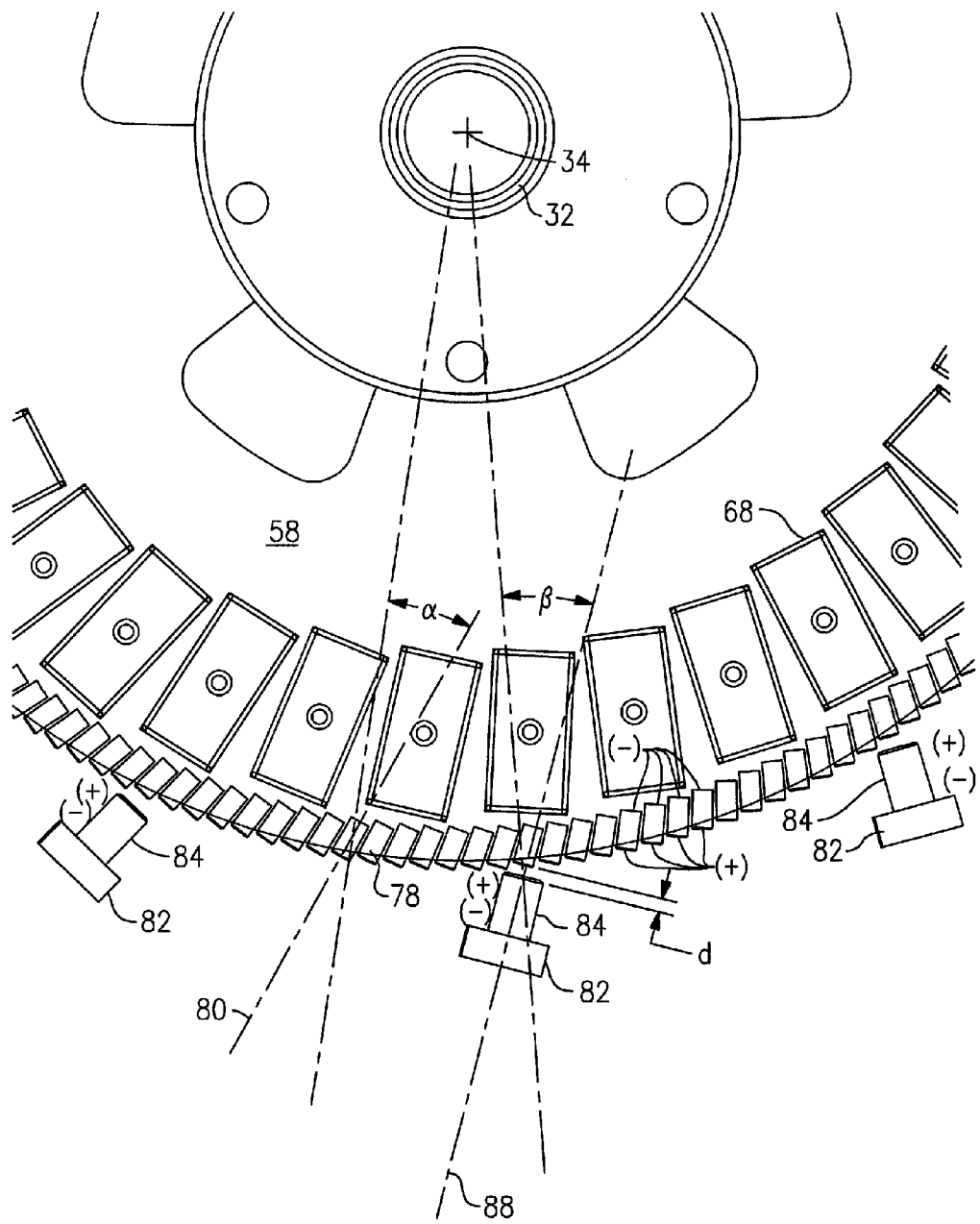
FIG. 5 is a plan view of a portion of the rotation augmentation assembly from FIG. 4.

Referring to FIGS. 4 and 5, the vertical axis wind turbine 100 further includes a rotation augmentation assembly 76 to assist in overcoming the inertia of start up. Shown are the previously disclosed rotating components, namely, the collar 54, the first rotor assembly 58, and the second rotor assembly 60. Hidden from view for clarity is the stator assembly 56. A first portion of the rotation augmentation assembly 76 includes a plurality of rotor augmentation magnets 78 coupled to the outer diameter of the first rotor assembly 58.

The axis 80 of the flux field of the rotor augmentation magnets 78 is aligned at a tangential offset angle α relative to a radial line extending from the axis 34 of the drive shaft 32. In the disclosed embodiment, there are 165 rotor augmentation magnets 78 in the first rotor assembly 58 comprising grade 42 neodymium, each magnet measuring 0.25 inches in diameter and 0.5 inches in length.

The rotation augmentation assembly 76 further includes a plurality of vertical pillars 82 secured to the support base (not shown). Twelve pillars 82 are illustrated, but more or less may be arranged according to the diameter and weight of the rotor components, and the strength of the augmenting magnets. Attached to each of the pillars 82 is an upper augmentation magnet 84 and a lower augmentation magnet 86. The upper augmentation magnet 84 is vertically aligned on the same plane as the first rotor assembly 58, and the lower augmentation magnet 86 is vertically aligned on the same plane as the second rotor assembly 60. Of course, if the vertical axis wind turbine 100 was a single rotor type, the lower set of augmentation magnets would not be required.

Turning to FIG. 5, wherein the lower augmentation magnets 86 are omitted for clarity, an axis 88 of the flux field for the upper augmentation magnet 84 is aligned at a tangential offset angle β relative to a radial line extending from the axis 34 of the drive shaft 32. In the illustrated example, the tangential offset angle α for axis 80 and the tangential offset angle β for axis 88 are equal, but some variation between them is permissible. The important design feature is to have some degree of tangential offset to create an offset force in the tangential direction with respect to the rotor. Thus, as can be seen with reference to FIG. 5, the magnetic flux fields of the upper augmentation magnets 84 and the rotor augmentation magnets 78 are aligned with (e.g., facing) each other, but tangentially offset an angle α with respect to the radius extending from the axis of rotation. The inventor has determined a useful range of values for the angle α (and β) to be between 1 degree and 30 degrees. A preferred range for the angle α (and β) is between 15 degrees and 20 degrees.

The two opposing rotation augmentation magnets 78, 84 (or 78, 86) are close-coupled to effect the most tangential force from the magnetic flux. The magnetic poles of the augmentation magnets are arranged so that like poles (e.g., N-N) are facing one another to create a repulsive force. In the disclosed embodiment, there are (12) upper augmentation magnets 84 and (12) lower augmentation magnets 86, each magnet comprising grade 42 neodymium and measuring 0.5 inches in diameter and 1 inch in length. The magnets are close-coupled a distance d from one another in the range of 0.0625 to 0.5 inches.

The rotation augmentation assembly 76 may be passive or active. In one example, a passive system utilizes a series of magnets that aide in rotation, but are not sufficient to initiate rotation of the sails 16 by themselves. In another example, an active system may utilize a series of magnets that is more than sufficient to initiate rotation, but the magnets are energized by a controller, for example.

The disclosed vertical axis wind turbine 100 is rated for 10 kW output, and is thus ideally suited for residential use. However, much larger commercial versions may be realized using the disclosed method for operating a multistage axial flux generator. Referring to FIG. 6, wherein like numerals indicate like elements from FIGS. 1-5, a commercial vertical axis wind turbine 200 includes a multistage axial flux generator 206, such as that disclosed hereinabove with respect to the residential wind turbine. The generator 206 includes a stator assembly 256 secured to a support base 202. The stator assembly 256, rather than being a disc-like structure, is embedded into a circumferential rail 290 on the support base 202. The stator assembly 256 includes a plurality of coils (not shown) defining at least two operative voltage output stages. As explained hereinabove, the commercial multistage axial flux generator 206 may have up to (or possibly more than) 100 voltage output stages.

The multistage axial flux generator 206 for the vertical axis wind turbine 200 further includes a rotor assembly 258 defined about a rotation axis 234. The rotor assembly 258 includes a plurality of permanent magnets (not shown) that are in sufficient proximity to the stator assembly 256 such that rotation of the rotor assembly 258 about the axis 234 induces a magnetic field in the coils. In the disclosed example, rotation is provided by the force of wind on sails 216. The sails 216 are coupled to bearings running in the track of the circumferential rails; rail 290*a* on the upper portion of the wind turbine 200 and 290*b* on the lower portion.

The plurality of coils in each stage are designed to begin producing useful voltage at a different rotational speed of the rotor assembly 258. The coils are in electrical communication with a voltage device (not shown), such as a rectifier.

One of the improvements of the present disclosure is the addition of the magnetic bearing assembly. The powerful magnets allow the rotating components in the vertical axis wind turbine to "float," thereby absorbing transient buffeting loads form wind gusts. Because much of the weight of the assembly can be unloaded, friction in the remaining bearings is drastically reduced, allowing the wind turbine to initiate rotation with less wind energy. Thus, the common problem of inefficiencies due to drag during part of the rotation is significantly reduced in a passive manner without complex components and controls. In addition, the magnetic bearings are able to absorb wind buffeting loads without imparting any additional forces to the drive shaft. And, harmonic vibrations from the rotor assembly are effectively dampened out.

The rotation augmentation assembly further reduces the effects of drag. The tangential forces developed on the rotor by the augmentation magnets assist in overcoming the initial slumping load on the bearings. The slumping load is developed in the static condition, and typically is much greater than the drag forces on the bearings when the system is rotating. In this manner, not only does the rotation augmentation assembly assist in initiating rotation, it also helps sustain rotation by offsetting a portion of the drag forces.

The disclosed sail assembly further assists in reducing the effects of drag. Turning to FIG. 7, the sail assembly 10 is shown from top view, with wind W blowing horizontally. The direction of sail rotation is denoted by R. The sails 16 are supported a radial distance away from the axis 34 by sail stiffener arms 30 and sail mount arms 14. Each sail captures the wind's kinetic energy in the cup-shaped center portion 92 of the sail, and transfers it to the rotation of the shaft, leaving the core of the sail assembly (e.g., the inner cylindrical volume out of the path of the sails) at a lower dynamic pressure than the ambient conditions. This lower pressure, combined with the rotational path of the sail inner edges, sets up a vortex 94 as indicated by the small arrows. As a sail rotates through the advancing direction A, the cup-shaped center portion 92 is aerodynamically unloaded, and the vortex 94 provides additional force on the sail. The additional force helps sustain rotation by offsetting a portion of the drag forces. In contrast, vertical wind turbines in the prior art that attach the sails directly to the shaft are incapable of forming the vortex, and often create regions of aerodynamic instability at the juncture of the sail and shaft. The instability further contributes to the other inefficiencies present in the system.

One advantage of the disclosed system 100 is that the peak efficiency of each output stage is spread out over a broad operating range. Prior art wind turbines having one output stage often needed a strong wind to initiate blade rotation, and did not reach rated power or peak efficiency until wind speeds were very high. For example, one common horizontal axis wind turbine requires 7 mph winds to initiate rotation, 10-12 mph winds to generate useful power, and approximately 50 mph to reach rated power. In contrast, the wind turbine disclosed herein with a novel sail design, magnetic bearing assembly, and multi-stage generator initiates rotation in winds of approximately 1-3 mph, generates useful power at 5 mph, and reaches rated power at approximately 20 mph.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Further, although specific terms are employed herein, they are used in a generic and descriptive sense only and not for purposes of limitation.

I claim:

1. A vertical wind turbine comprising:
   a support base defined about an axis;
   a bearing assembly comprising a fixed ring and a rotating ring, the fixed ring coupled to the support base;
   a drive shaft having a proximal end and an opposing distal end, the drive shaft coupled to the rotating ring of the bearing assembly;
   a multistage axial flux generator comprising a rotor assembly coupled to the drive shaft and a stator assembly coupled to the support base, the rotor assembly comprising a plurality of permanent magnets, the stator assembly comprising a plurality of coils defining at least two voltage output stages, wherein the permanent magnets on the rotor assembly are close-coupled to the coils on the stator assembly, wherein the stator assembly further comprises a second plurality of windings defining at least two voltage output stages, and the vertical wind turbine system further comprises a second rotor assembly defined about the axis and coupled to the drive shaft, the second rotor assembly comprising a second plurality of permanent magnets secured to a planar face thereof, the second plurality of permanent magnets being close-coupled to the second plurality of windings on the stator assembly; and
   a plurality of sails coupled to the drive shaft.

2. The vertical wind turbine of claim 1, further comprising a rotation augmentation assembly comprising:
   a rotor augmentation magnet coupled to a diameter of the rotor assembly, the rotor augmentation magnet aligned at a first tangential offset angle relative to a radial line extending from the axis of the drive shaft, the first tangential offset angle being in the range of 1 degree and 30 degrees; and
   a stationary augmentation magnet secured to the support base, a like pole of the stationary augmentation magnet aligned at a second tangential offset angle relative to a radial line extending from the axis of the drive shaft, the second tangential offset angle being in the range of 1 degree and 30 degrees.

3. The vertical wind turbine of claim 2, wherein the first and second tangential offset angle is between 15 degrees and 20 degrees.

4. The vertical wind turbine of claim 1, further comprising a sail assembly coupled to the drive shaft, the sail assembly comprising a sail hub, a plurality of sail mount arms coupled to the sail hub, the plurality of sails coupled to the sail mount arms.

5. The vertical wind turbine system of claim 1, wherein the bearing assembly is a magnetic bearing assembly and the plurality of sails define a vertical load, at least a portion of the vertical load counteracted by the magnetic bearing assembly.

6. The vertical wind turbine system of claim 1, wherein the support base comprises a housing portion and a support column, the support column being concentric about the axis.

7. The vertical wind turbine system of claim 6, wherein the fixed ring of the bearing assembly is coupled to the support column, and rotating ring of the bearing assembly is coupled to the proximal end of the drive shaft.

8. The vertical wind turbine system of claim 6, wherein the rotor assembly of the axial flux generator is coupled to the distal end of the drive shaft, and the stator assembly is coupled to the housing portion of the support base.

9. The vertical wind turbine system of claim 6, wherein the plurality of sails are coupled to the proximal end of the drive shaft.

10. A vertical wind turbine comprising:
a support base defined about an axis;
a bearing assembly comprising a fixed ring and a rotating ring, the fixed ring coupled to the support base;
a drive shaft having a proximal end and an opposing distal end, the drive shaft coupled to the rotating ring of the bearing assembly;
an axial flux generator comprising a rotor assembly coupled to the drive shaft and a stator assembly coupled to the support base, the rotor assembly comprising a plurality of permanent magnets, the stator assembly comprising a plurality of coils, wherein the permanent magnets on the rotor assembly are close-coupled to the coils on the stator assembly;
a rotor augmentation magnet coupled to a diameter of the rotor assembly, the rotor augmentation magnet aligned at a first tangential offset angle relative to a radial line extending from the axis of the drive shaft, the first tangential offset angle being in the range of 1 degree and 30 degrees;
a stationary augmentation magnet secured to the support base, a like pole of the stationary augmentation magnet aligned at a second tangential offset angle relative to a radial line extending from the axis of the drive shaft, the second tangential offset angle being in the range of 1 degree and 30 degrees; and
a plurality of sails coupled to the drive shaft.

11. The vertical wind turbine of claim 10, wherein the axial flux generator is a multistage axial flux generator, the plurality of coils on the stator assembly defining at least two voltage output stages.

* * * * *